United States Patent [19]
Walsh

[11] Patent Number: 5,570,711
[45] Date of Patent: Nov. 5, 1996

[54] COMPOSITE AND TIE LAYER THEREFOR

[75] Inventor: Brian J. Walsh, Sylvania, Ohio

[73] Assignee: Aeroquip Corporation, Maumee, Ohio

[21] Appl. No.: 512,846

[22] Filed: Aug. 9, 1995

Related U.S. Application Data

[63] Continuation of Ser. No. 206,876, Mar. 4, 1994, Pat. No. 5,441,155.

[51] Int. Cl.$^6$ .................................................. F16L 11/00
[52] U.S. Cl. ........................ 138/137; 138/141; 138/125; 138/126
[58] Field of Search ........................... 138/137, 124–126, 138/118, 140, 141; 428/36, 36.7, 36.6

[56] References Cited

U.S. PATENT DOCUMENTS

| | | | |
|---|---|---|---|
| 3,907,955 | 9/1975 | Viennot | 264/105 |
| 4,059,847 | 11/1977 | Phillips et al. | 138/125 X |
| 4,685,090 | 8/1987 | Krevor | 138/137 X |
| 4,887,647 | 12/1989 | Igarashi et al. | 138/126 |
| 5,038,833 | 8/1991 | Brunnnhofer | 138/137 |
| 5,167,259 | 12/1992 | Brunnhofer | 138/137 |
| 5,170,011 | 12/1992 | Martucci | 138/118 X |
| 5,320,888 | 6/1994 | Stevens | 428/36.2 |

*Primary Examiner*—Patrick Brinson
*Attorney, Agent, or Firm*—Emch, Schaffer, Schaub & Porcello Co., L.P.A.

[57] ABSTRACT

The present invention provides a composite or hose which minimizes hydrocarbon emission in fuel systems. The composite or hose is especially suitable for motor vehicles. The composite or hose uses a thin, inner layer of a polyfluorocarbon polymer and an outer layer of a thermoplastic elastomer.

23 Claims, 2 Drawing Sheets

COMPOSITE AND TIE LAYER THEREFOR

This is a continuation of application Ser. No. 08/206,876 filed Mar. 4, 1994, now U.S. Pat. No. 5,441,155.

DESCRIPTION

1. Technical Field

This invention relates to laminates for motor vehicle uses. More specifically, I designed the laminates for use with fuel systems.

2. Background Art

Due to increasing regulation governing hydrocarbon emissions, motor vehicles require fuel system components which minimize hydrocarbon permeation. Hydrocarbon evaporative emissions can arise from many sources on a vehicle. A major part of those are associated with the fuel and fuel vapor systems. These hydrocarbon emissions can come from the many different parts of the fuel system and from its general usage:

- refueling the vehicle,
- normal operation of the vehicle (running losses),
- permeation of the fuel constituents through the walls of the components that contain the fuel, and
- migration of the fuel or vapor through connections, interfaces, and any other places where different parts of the fuel system are assembled.

Typical components in the fuel system which permit hydrocarbon emissions are non-metallic items, such as fuel tanks, fuel filler necks, fuel lines, vapor lines and the like. Traditionally, these components use materials such as nylon or thermoset rubbers which no longer meet environmental emission regulations.

Tetrafluoroethylene (TFE) type polymers provide an excellent barrier to fuel permeation. However, TFE is extremely expensive when compared to nylon and other plastics and stiff when compared to rubber and therefore are not a direct replacement for conventional materials. Attempts to combine TFE polymers with nylon result in a rigid tube or hose with poor flexibility that can not be attached easily to an end fitting. Combining TFE polymers with thermoset rubber results in a relatively complex manufacturing process requiring vulcanization of the rubber and a costly end product.

DISCLOSURE OF THE INVENTION

My composites utilize a very thin, inner liner or layer consisting essentially of a polyfluorocarbon polymer, along with an outer layer or cover consisting essentially of a thermoplastic elastomer (TPE). Preferably, the outer layer is relatively thick in comparison to the thin, inner layer.

This unique TFE/TPE composite approach to fuel system components has the following advantages over available technology:

a) low permeation due to the presence of TFE;

b) a high degree of flexibility due to the thinness of the TFE layer and the flexibility of TPE layer;

c) low cost due to the minimization of TFE and a single step manufacturing process which requires no vulcanization of rubber; and d) end fittings using traditional band clamps instead of crimp fittings due to the softness of the tube.

BEST MODE OF CARRYING OUT INVENTION

Figure 1:
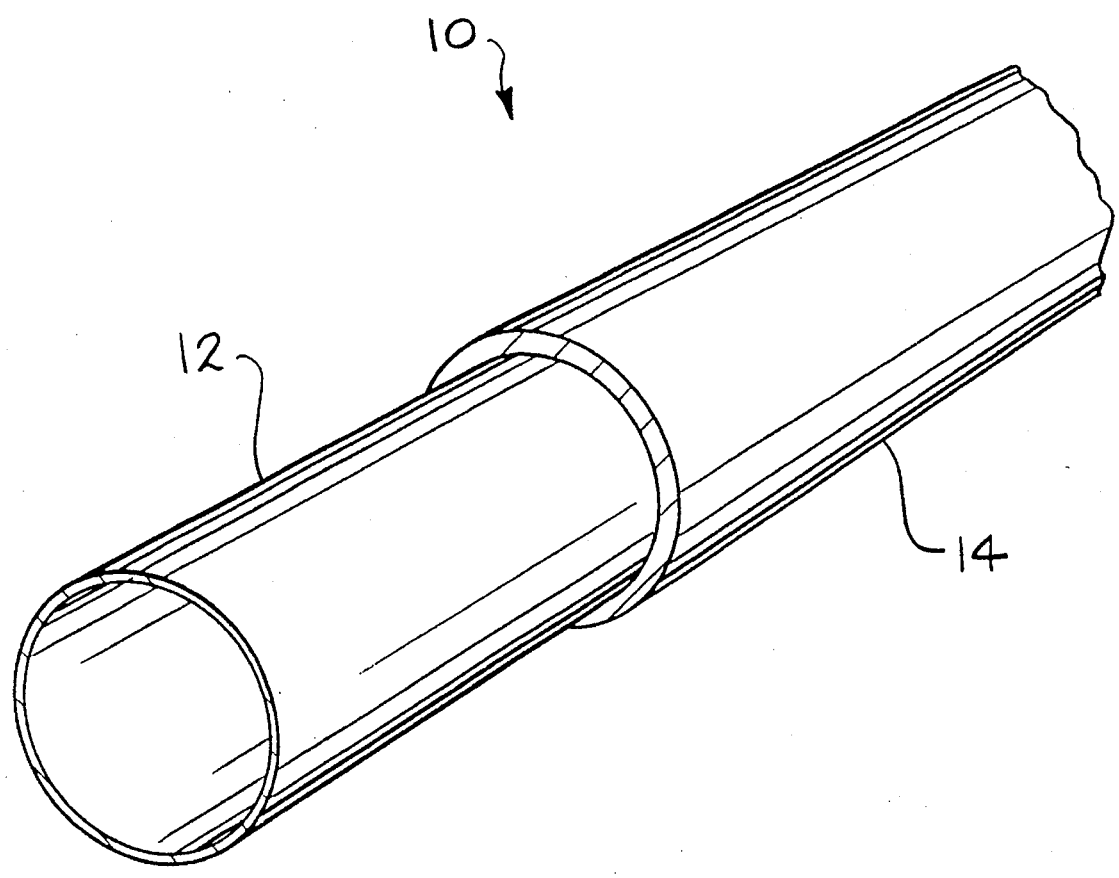
FIG. 1 is a perspective view, partly cut away, illustrating a hose using the laminate of this invention.
Figure 2:
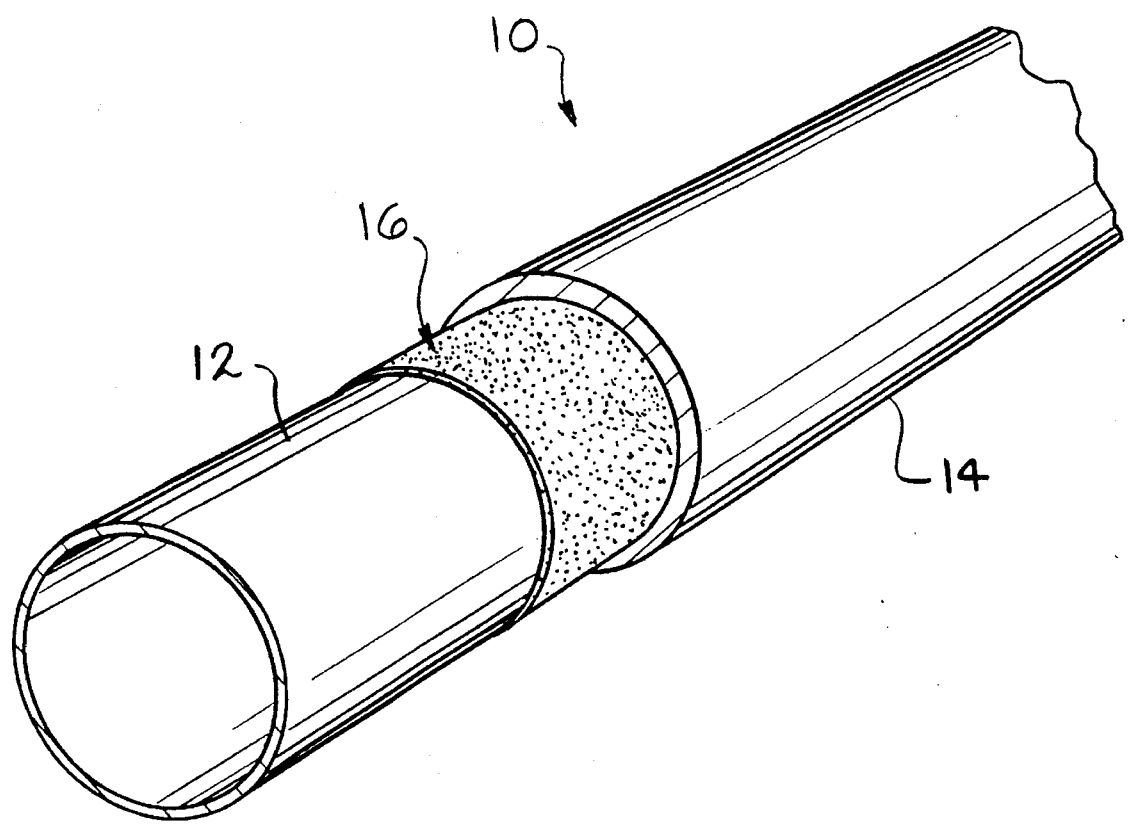
FIG. 2 is a perspective view, partly cut way showing the hose of FIG. 1 with a tie layer between the inner layer and outer layer.

FIG. 1 shows hose 10 using the laminate of this invention. Hose 10 is a multi-layer structure which comprises thin, inner layer 12 and outer layer 14. Thin, inner layer 12 consists essentially of a polyfluorocarbon polymer (TFE) and outer layer 14 consists essentially of a thermoplastic elastomer (TPE). FIG. 2 shows hose 10 with tie layer 16 between inner layer 12 and outer layer 14.

The polyfluorocarbon polymer thin inner layer 12 varies widely. This term includes polytetrafluoroethylene (PTFE), polymers of chlorotrifluoroethylene, fluorinated ethylene-propylene polymers, polyvinylidene fluoride, hexafluoropropylene and the like. The term also includes copolymers of these polymers. Preferably, the polyfluorocarbon is tetrafluoroethylene hexafluoropropylene vinylidene fluoride (THV) copolymers. Generally, thin, inner layer 12 only has a thickness ranging from 0.001 inch to 0.025 inch. Preferably, this thickness ranges from 0.005 inch to 0.020 inch.

A thermoplastic elastomer (TPE) is a material with the functional properties and performance of a conventional thermoset rubber, but the processing characteristics of a thermoplastic.

A TPE has two or more intermingled polymer systems, each with its own phase and softening temperature (Ts). In the useful temperature range one phase (the soft or elastomeric phase) will be above its Ts and the other phase (the hard phase) will be below its Ts. The hard phase thus anchors or restricts the movement of the polymer chains of the soft phase, with a resistance to deformation resulting.

There are six generic classes of thermoplastic elastomers: 1) styrene block copolymers, 2) polyolefinic blends, 3) elastomeric alloys, 4) polyurethanes, 5) copolyesters, and 6) polyamides.

Styrenic TPEs are block copolymers of styrene with a diene such as butadiene or isoprene or with an olefin pair such as ethylenepropylene or ethylene-butylene. The hard phase is an aggregate of polystyrene blocks, and the soft or elastomer phase is an aggregate of rubberlike polydiene or olefin pair blocks.

Polyolefin TPEs are composed of two polymer systems, each with its own phase. The harder of these polymers is a polyolefin- commonly PP or PE. The softer of these polymers is an elastomer-most often ethylene-propylene rubber with little or no crosslinking. The continuous phase normally is that of the polymer present in greatest amount. Olefinic TPEs based on EPDM rubber have very good resistance to ozone and oxidative attack in air.

Elastomeric alloy TPEs may have one or more phases. Thermoplastic vulcanizate (TPV) elastomeric alloys consist of a finely divided dispersion of highly vulcanized elastomer (such as EPDM or NBR) in a matrix of polyolefin. The degree of vulcanization and fineness of dispersion are of basic importance to the properties of the TPV. The compatibility of the rubber and plastic phases will determine the degree to which a compatibilizer is needed to stabilize the dispersion.

A second type of elastomeric alloy is melt processible rubbers (MPRs). These TPEs are said to consist of a plasticized chlorinated polyolefin blend often with significant carbon black content. The crosslinking of the elastomer phase in TPVs confers upon them superior set (compression, tension, etc.) resistance, retention of properties at elevated temperature, fatigue resistance, and markedly improved oil resistance.

Thermoplastic polyurethanes (TPUs) are block, copolymers with soft and hard blocks. They are prepared by the melt polymerization of a low molecular-weight glycol with a diisocyanate and a macroglycol (MW 1000 to 2000). The soft segments consist of the macroglycol which may be an aliphatic polyester or polyether. The hard segments result from the reaction of the glycol with diisocyanate, which also binds them to the soft segments.

Copolyester TPEs are block copolymers composed of alternating hard and soft segments. The hard segments consist of polyalkylene terephthalate and the soft segment of a polyalkylene ether. The alkylene group is commonly 1,4-butylene. The linkages in the hard segments are ester, those in the soft segments being ether Polyamide TPEs are either a polyether block polyamide or a polyester block polyamid. The hard segments are polyamides and the soft segments either an aliphatic polyether or polyester.

Typically, outer layer 14 has a thickness which only practical considerations limit. Generally, however, outer layer 14 has a thickness ranging from 0.030 inch to 0.500 inch. Preferably, the thickness ranges from 0.030 inch to 0.250 inch.

One can perform various treatments on the TFE layer after extrusion, such as sodium etching, adding groves to the TFE, corona treating or applying liquid adhesive. These treatments allow for better bonding between the TFE liner and TPE outer layer. Preferably, however, I use a coextrudable tie layer between the TFE layer and TPE outer layer for better bonding. I have found a melt processable tie layer to be especially useful.

Other embodiments of my invention include a composite or tube comprising three layers: a TPE, thin inner liner and a TPE outer layer with a TFE, thin inner layer between the thin liner and outer layer. This embodiment also may include a tie layer or treatment between each layer.

Also, my embodiments may include a thin, conductive TFE liner on the inside of the tube. Typically, this is a carbon black filled TFE. The conductive liner dissipates any static charge or electricity and is a safety device common to the industry.

EXAMPLE

Fuel permeation was tested in accordance to the SAE fuel permeation method XJ 1737. This test method measures the amount of fuel permeation through a tube or hose while controlling fuel temperature and pressure independently. This is achieved with a recirculating system in which fuel is passed through the tube wall. Fuel which permeates through the tube wall is evaporated and collected by a controlled flow of nitrogen over the outside of the tube and absorbed in activated carbon. Weight gain of the carbon is then measured and the permeation results expressed as grams weight gain of the carbon, per square meter of internal surface area of the tube being tested, per day of test time. ($g/m^2/day$)

Flexibility is always a desirable property for hose and tubing. The relative hardness and flexural modulus of the materials used in the tubes construction determine flexibility in addition, flexibility plays an important role in kink resistance which permits routing in confined areas and allows the tubing to be easily clamped to an end fitting. Obviously, flexibility, kink resistance and clampability are inter-related.

The present state of technology for most motor vehicle fuel tubes is a nylon construction. Attempts to use TFE or TFE composites have resulted in extremely rigid construction. This invention, a TFE/TPE composite allows for the flexibility of a rubber tube with permeation resistance of a TFE tube.

| Tube Construction | Permeation Rate ($g/m^2/Day$) | Clampability | Kink Resistance | Flexibility |
|---|---|---|---|---|
| Nitrile Rubber (control) | 1000 | Excellent | Excellent | Excellent |
| Nylon 12 (control) | 600 | Poor | Poor | Poor |
| Teflon (control) | 10 | Poor | Poor | Poor |
| TFE/TPE Composite | 20 | Excellent | Excellent | Excellent |

The TFE I employed was tetrafluoroethylene hexafluoropropylene vinylidene fluoride. The TPEs 1 used were elastomeric alloy TPEs. I tested two different TPEs. They were "Santoprene" and "Alcryn". Santoprene is a TPE which is a blend of polypropylene and EPDM rubber. Alcryn is a partially cross-linked halogenated alloy TPE which is a blend of nitrile rubber and polyvinyl chloride (PVC). I achieved the results given with both TPEs.

I claim:

1. A composite suitable for use with fuel systems for motor vehicles comprising:

a thin inner layer resistant to hydrocarbon fuel permeation consisting essentially of a polyfluorocarbon polymer wherein the polyfluorocarbon polymer is tetrafluoroethylene hexafluoropropylene vinylidene fluoride; and an outer cover consisting essentially of a thermoplastic elastomer wherein the thermoplastic elastomer is selected from the group consisting of styrene block copolymers, polyolefinic blends, elastomeric alloys, polyurethanes, copolyesters and elastomeric polyamides.

2. A composite according to claim I wherein the thin, inner layer has a thickness ranging from 0.001 inch to 0.025 inch and the outer layer has a thickness ranging from 0.030 inch to 0.500 inch.

3. A composite according to claim I wherein the thin, inner layer has a thickness ranging from 0.005 inch to 0.020 inch and the outer layer has a thickness ranging from 0.030 inch to 0.250 inch.

4. A composite according to claim 1 wherein the thermoplastic elastomer is a polyolefinic thermoplastic elastomer.

5. A composite according to claim 1 wherein the thermoplastic elastomer is a polyolefinic thermoplastic elastomer of polypropylene and ethylene-propylene diene rubber.

6. A composite according to claim 1 wherein the thermoplastic elastomer is a partially cross-linked halogenated polyolefin alloy.

7. A composite according to claim 6 wherein the polyolefin alloy is a blend of nitrile rubber and polyvinyl chloride.

8. A tube suitable for use with fuel systems for motor vehicles comprising:

a thin inner liner resistant to hydrocarbon fuel permeation consisting essentially of a polyfluorocarbon polymer wherein the polyfluorocarbon polymer is tetrafluoroethylene hexafluoropropylene vinylidene fluoride; and an outer cover consisting essentially of a thermoplastic elastomer, wherein the thermoplastic elastomer is selected from the group consisting of styrene block copolymers, polyolefinic blends, elastomeric alloys, polyurethanes, copolymers and elastomeric polyamides.

9. A tube according to claim 8 wherein the thin, inner liner has a thickness ranging from 0.001 inch to 0.025 inch and the outer cover has a thickness ranging from 0.030 inch to 0.500 inch.

10. A tube according to claim 8 wherein the thin, inner liner has a thickness ranging from 0.005 inch to 0.020 inch and the outer cover has a thickness ranging from 0.030 inch to 0.250 inch.

11. A tube according to claim 8 wherein the thermoplastic elastomer is a elastomeric alloy thermoplastic elastomer.

12. A tube according to claim 8 wherein the thermoplastic elastomer is a thermoplastic elastomer of polypropylene and ethylene-propylene diene rubber.

13. A tube according to claim 8 wherein the thermoplastic elastomer is a partially cross-linked halogenated elastomeric alloy.

14. A tube according to claim 13 wherein the elastomeric alloy is a blend of nitrile rubber and polyvinyl chloride.

15. A tube suitable for use with fuel systems for motor vehicles comprising:

a thin inner liner resistant to hydrocarbon fuel permeation consisting essentially of a polyfluorocarbon polymer;

an outer cover consisting essentially of a thermoplastic elastomer, wherein the thermoplastic elastomer is selected from the group consisting of styrene block copolymers, polyolefinic blends, elastomeric alloys, polyurethanes, copolymers and elastomeric polyamides; and wherein the thin, inner liner is bonded to the outer cover with a tie layer therebetween.

16. A tube suitable for use with fuel systems for motor vehicles comprising:

a thin inner liner resistant to hydrocarbon fuel permeation consisting essentially of a polyfluorocarbon polymer;

an outer cover consisting essentially of a thermoplastic elastomer, wherein the thermoplastic elastomer is selected from the group consisting of styrene block copolymer, polyolefinic blends, elastomeric alloys, polyurethane, copolyesters and elastomeric polyamides; and a coextrudable tie layer therebetween bonding the thin, inner liner to the outer cover.

17. A tube suitable for use with fuel systems for motor vehicles comprising:

a thin inner liner resistant to hydrocarbon fuel permeation consisting essentially of a polyfluorocarbon polymer;

an outer cover consisting essentially of a thermoplastic elastomer, wherein the thermoplastic elastomer is selected from the group consisting of styrene block copolymer, polyolefinic blends, elastomeric alloys, polyurethanes, copolyesters and elastomeric polyamides; and a melting processable tie layer therebetween bonding the thin, inner liner to the outer cover.

18. A tube suitable for use with fuel systems for motor vehicles comprising:

a thin inner layer resistant to hydrocarbon fuel permeation consisting essentially of a thermoplastic elastomer;

an outer cover consisting essentially of a thermoplastic elastomer, wherein the thermoplastic elastomer is selected from the group consisting of styrene block copolymer, polyolefinic blends, elastomeric alloys, polyurethanes, copolyesters and elastomeric polyamides; and a thin layer of polyfluorocarbon polymer between the thin, inner liner and the outer cover.

19. A tube according to claim 18 wherein the thin inner liner and the outer cover are bonded to the thin layer of polyfluorocarbon polymer.

20. A tube according to claim 19 wherein tie layers bond the thin inner liner and the outer cover to the thin layer of polyfluorocarbon polymer.

21. A tube according to claim 20 wherein the tie layers are melt processable tie layers.

22. A tube according to claim 18 herein the thin inner line is bonded to the thin layer of polyfluorocarbon polymer.

23. A tube according to claim 18 wherein the outer cover is bonded to the thin layer of polyfluorocarbon polymer.

* * * * *